(12) United States Patent
Gejdos et al.

(10) Patent No.: US 8,112,390 B2
(45) Date of Patent: Feb. 7, 2012

(54) METHOD AND SYSTEM FOR MERGING EXTENSIBLE DATA INTO A DATABASE USING GLOBALLY UNIQUE IDENTIFIERS

(75) Inventors: Igor Gejdos, Indianapolis, IN (US);
Timothy L. Beck, Pendleton, IN (US);
Morris J. Young, Indianapolis, IN (US);
David Patrick Mott, Indianapolis, IN (US)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 543 days.

(21) Appl. No.: 11/999,947

(22) Filed: Dec. 7, 2007

(65) Prior Publication Data
US 2009/0150377 A1    Jun. 11, 2009

(51) Int. Cl.
*G06F 7/00* (2006.01)
*G06F 17/00* (2006.01)

(52) U.S. Cl. .................. 707/610; 707/611; 707/616

(58) Field of Classification Search ............. 707/1
See application file for complete search history.

(56) References Cited

U.S. PATENT DOCUMENTS

| | | | |
|---|---|---|---|
| 5,251,126 A | 10/1993 | Kahn et al. | |
| 5,497,486 A | 3/1996 | Stolfo et al. | |
| 5,671,404 A | 9/1997 | Lizee et al. | |
| 5,671,409 A | 9/1997 | Fatseas et al. | |
| 5,758,355 A * | 5/1998 | Buchanan | 1/1 |
| 5,951,300 A | 9/1999 | Brown | |
| 5,995,962 A | 11/1999 | Horowitz | |
| 6,024,699 A | 2/2000 | Surwit et al. | |
| 6,032,119 A | 2/2000 | Brown et al. | |
| 6,322,502 B1 | 11/2001 | Schoenberg et al. | |
| 6,425,863 B1 | 7/2002 | Werner et al. | |
| 6,453,325 B1 * | 9/2002 | Cabrera et al. | 707/204 |
| 6,562,001 B2 | 5/2003 | Lebel et al. | |
| 6,564,105 B2 | 5/2003 | Starkweather et al. | |
| 6,571,128 B2 | 5/2003 | Lebel et al. | |
| 6,577,899 B2 | 6/2003 | Lebel et al. | |
| 6,585,644 B2 | 7/2003 | Lebel et al. | |
| 6,605,038 B1 | 8/2003 | Teller et al. | |
| 6,635,014 B2 | 10/2003 | Starkweather et al. | |
| 6,648,821 B2 | 11/2003 | Lebel et al. | |
| 6,651,216 B1 * | 11/2003 | Sullivan et al. | 715/205 |
| 6,659,948 B2 | 12/2003 | Lebel et al. | |
| 6,668,196 B1 | 12/2003 | Villegas et al. | |

(Continued)

FOREIGN PATENT DOCUMENTS
DE          20217855       2/2003

(Continued)

OTHER PUBLICATIONS

Lee et al., Conflict Resolution of Data Synchronization in Mobile Environment, ICCSA 2004, LNCS 3044, pp. 196-205, 2004.*

(Continued)

*Primary Examiner* — Jay Morrison
(74) *Attorney, Agent, or Firm* — Faegre Baker Daniels LLP (57) ABSTRACT

A method of merging data from one database into another database uses metadata identifiers to indicate the type of data. One of the databases can be stored on a medical device, and the other of the databases can be stored on a computer. When transferring data from the first database to the second database, the metadata identifiers are used to identify and merge common data types.

29 Claims, 4 Drawing Sheets

U.S. PATENT DOCUMENTS

| | | |
|---|---|---|
| 6,684,191 B1 | 1/2004 | Barnard et al. |
| 6,687,546 B2 | 2/2004 | Lebel et al. |
| 6,694,191 B2 | 2/2004 | Starkweather et al. |
| 6,733,446 B2 | 5/2004 | Lebel et al. |
| 6,740,075 B2 | 5/2004 | Lebel et al. |
| 6,748,402 B1 | 6/2004 | Reeves |
| 6,758,810 B2 | 7/2004 | Lebel et al. |
| 6,781,522 B2 | 8/2004 | Sleva et al. |
| 6,804,656 B1 | 10/2004 | Rosenfeld et al. |
| 6,810,290 B2 | 10/2004 | Lebel et al. |
| 6,811,533 B2 | 11/2004 | Lebel et al. |
| 6,811,534 B2 | 11/2004 | Bowman, IV et al. |
| 6,813,519 B2 | 11/2004 | Lebel et al. |
| 6,852,104 B2 | 2/2005 | Blomquist |
| 6,873,268 B2 | 3/2005 | Lebel et al. |
| 6,873,807 B2 | 3/2005 | Umetsu |
| 6,958,705 B2 | 10/2005 | Lebel et al. |
| 6,990,434 B2 | 1/2006 | Minogue et al. |
| 7,020,508 B2 | 3/2006 | Stivoric et al. |
| 7,024,236 B2 | 4/2006 | Ford et al. |
| 7,028,058 B2 * | 4/2006 | Russon .......... 707/204 |
| 7,029,455 B2 | 4/2006 | Flaherty |
| 7,041,468 B2 | 5/2006 | Drucker et al. |
| 7,050,735 B2 | 5/2006 | Bardolatzy et al. |
| 7,063,665 B2 | 6/2006 | Hasegawa et al. |
| 7,082,334 B2 | 7/2006 | Boute et al. |
| 7,113,946 B2 | 9/2006 | Cosic |
| 7,120,488 B2 | 10/2006 | Nova et al. |
| 7,165,062 B2 | 1/2007 | O'Rourke |
| 7,179,226 B2 | 2/2007 | Crothall et al. |
| 7,181,350 B2 | 2/2007 | Oberding et al. |
| 7,207,009 B1 | 4/2007 | Aamodt et al. |
| 2002/0016568 A1 | 2/2002 | Lebel et al. |
| 2002/0029776 A1 | 3/2002 | Blomquist |
| 2002/0040208 A1 | 4/2002 | Flaherty et al. |
| 2002/0059299 A1 | 5/2002 | Spaey |
| 2002/0140976 A1 | 10/2002 | Borg et al. |
| 2002/0193679 A1 | 12/2002 | Malave et al. |
| 2003/0002848 A1 | 1/2003 | Kawaoka et al. |
| 2003/0011646 A1 | 1/2003 | Levine et al. |
| 2003/0065308 A1 | 4/2003 | Lebel et al. |
| 2003/0065536 A1 | 4/2003 | Hansen et al. |
| 2003/0069758 A1 | 4/2003 | Anderson et al. |
| 2003/0098869 A1 | 5/2003 | Arnold et al. |
| 2003/0140044 A1 | 7/2003 | Mok et al. |
| 2003/0145206 A1 | 7/2003 | Wolosewicz et al. |
| 2003/0163088 A1 | 8/2003 | Blomquist |
| 2003/0199739 A1 | 10/2003 | Gordon et al. |
| 2003/0208465 A1 | 11/2003 | Yurko et al. |
| 2004/0030987 A1 | 2/2004 | Manelli |
| 2004/0038389 A1 | 2/2004 | Maus et al. |
| 2004/0073464 A1 | 4/2004 | Huang |
| 2004/0086314 A1 | 5/2004 | Chen et al. |
| 2004/0111296 A1 | 6/2004 | Rosenfeld et al. |
| 2004/0119742 A1 | 6/2004 | Silbey et al. |
| 2004/0172284 A1 | 9/2004 | Sullivan et al. |
| 2004/0193952 A1 * | 9/2004 | Narayanan et al. .......... 714/13 |
| 2005/0004947 A1 | 1/2005 | Emlet et al. |
| 2005/0010452 A1 | 1/2005 | Lusen |
| 2005/0137653 A1 | 6/2005 | Friedman et al. |
| 2005/0159977 A1 | 7/2005 | Green et al. |
| 2005/0182655 A1 | 8/2005 | Merzlak et al. |
| 2005/0187794 A1 | 8/2005 | Kimak |
| 2005/0192844 A1 | 9/2005 | Esler et al. |
| 2005/0240615 A1 * | 10/2005 | Barsness et al. .......... 707/102 |
| 2005/0259945 A1 | 11/2005 | Splaver |
| 2006/0010014 A1 | 1/2006 | Brown |
| 2006/0020491 A1 | 1/2006 | Mongeon et al. |
| 2006/0031094 A1 | 2/2006 | Cohen et al. |
| 2006/0095298 A1 | 5/2006 | Bina |
| 2006/0155581 A1 | 7/2006 | Eisenberger et al. |
| 2006/0161460 A1 | 7/2006 | Smitherman et al. |
| 2006/0167367 A1 | 7/2006 | Stanczak et al. |
| 2006/0178910 A1 | 8/2006 | Eisenberger et al. |
| 2006/0184524 A1 | 8/2006 | Pollanz |
| 2006/0224638 A1 | 10/2006 | Wald et al. |
| 2006/0272652 A1 | 12/2006 | Stocker et al. |
| 2007/0033074 A1 | 2/2007 | Nitzan et al. |
| 2007/0048691 A1 | 3/2007 | Brown |
| 2007/0055940 A1 | 3/2007 | Moore et al. |
| 2007/0088525 A1 | 4/2007 | Fotiades et al. |
| 2007/0088707 A1 * | 4/2007 | Durgin et al. .......... 707/10 |
| 2007/0089071 A1 | 4/2007 | Zinn et al. |
| 2007/0179352 A1 | 8/2007 | Randlov et al. |
| 2007/0179975 A1 | 8/2007 | Teh et al. |
| 2007/0185390 A1 | 8/2007 | Perkins et al. |
| 2007/0189590 A1 | 8/2007 | Fidrich et al. |
| 2007/0219432 A1 | 9/2007 | Thompson |
| 2007/0232866 A1 | 10/2007 | Nephin et al. |
| 2007/0276197 A1 | 11/2007 | Harmon |
| 2008/0263007 A1 * | 10/2008 | Schmidt .......... 707/3 |

FOREIGN PATENT DOCUMENTS

| | | |
|---|---|---|
| EP | 0970655 | 1/2000 |
| EP | 0649316 | 12/2000 |
| EP | 1194864 | 4/2002 |
| EP | 1416417 | 5/2004 |
| EP | 1647929 | 4/2006 |
| EP | 1662417 | 5/2006 |
| JP | 04/145774 | 5/2004 |
| JP | 04/145775 | 5/2004 |
| JP | 04/145776 | 5/2004 |
| JP | 07/058685 | 3/2007 |
| WO | WO9609590 | 3/1996 |
| WO | WO0018449 | 4/2000 |
| WO | WO0065522 | 11/2000 |
| WO | WO0072181 | 11/2000 |
| WO | WO0174229 | 10/2001 |
| WO | WO0200111 | 1/2002 |
| WO | WO02078512 | 10/2002 |
| WO | WO03015838 | 2/2003 |
| WO | WO2005037095 | 4/2005 |
| WO | WO2005096206 | 10/2005 |
| WO | WO2006050485 | 5/2006 |
| WO | WO2007005530 | 1/2007 |
| WO | WO2007084502 | 7/2007 |
| WO | WO2007093482 | 8/2007 |

OTHER PUBLICATIONS

Wang, C. et al.; "*A CORBA-Based Object Framework with Patient Identification Translation and Dynamic Linking, Methods for Exchanging Patient Data*," Methods of Information in Medicine, Mar. 1999, pp. 56-65, vol. 38, No. 1, F.K.Schattauer Verlagsgesellschaft mbH, Germany.

Bilenko, M. et al.; "*Adaptive Name Matching in Information Integration*," IEEE Intelligent Systems; Sep. 2003, vol. 18, No. 5; p. 16-23, IEEE Computer Society.

Frenger, Paul; "*GRANNIE 2: a Ubiquitous, Protean Robotic Guardian Angel*," Automation Science and Engineering, Sep. 1, 2007, pp. 857-862, IEEE International Conference on IEEE.

Frenger, Paul; "*GRANNIE: a Scalable, Interactive, Artificial Intelligence Supervisory System for Medical Devices*," Proceedings of Can. Med. Bio. Eng. Conference, 2007, p. 256-259.

"CoPilot Health Management System Version 3.1," User's Guide, Mar. 2007, 230 pp., ART 10641 Rev. D, Abbott Diabetes Care, Inc.

"MediSense® Precision Link® Diabetes Data Management Software," User's Guide, May 2006, 58 pp., 116-412 Rev. AC, Abbott Diabetes Care, Inc.

Albisser, Michael A.; "A Graphical User Interface for Diabetes Management Than Integrates Glucose Prediction and Decision Support," Diabetes Technology & Therapeutics, 2005, pp. 264-273, vol. 7, No. 2.

Janssen et al., "Acensia® Winglucofacts® Professional Intelligent Diabetes Management Software is an Effective Tool for the Management of Diabetes," Bayer HealthCare Clinical Summary Report, Jul. 2005, 10 pp.

Joshy et al.; "Diabetes Information Systems: A Rapidly Emerging Support for Diabetes Surveillance and Care," Diabetes Technology & Therapeutics, 2006, pp. 587-597, vol. 8, No. 5.

"OneTouch Diabetes Management Software," User Manual, 2006, 173 pp., v. 2.3.1, Lifescan, Inc.

"Getting Started, CareLink Personal Therapy Management Software for Diabetes," Brochure, 2007, 20 pp., Medtronic Minimed, Inc.

"Accu-Chek® Carnit Pro Diabetes Management Software," User's Manual, 2005, 220 pp., v.2.1 and Addendum v. 2.4, Roche Diagnostics Corp.

"Accu-Chek® Compass Diabetes Care Software," User's Guide, 2005, 74 pp., Roche Diagnostics Corp.

"Accu-Chek® Diabetes Assistant," accessed with notional data and printed from www.diabetesassistant.com on Jan. 16, 2007, 20 pp., Roche Diagnostics Corp.

PCT International Search Report and Written Opinion of the International Search Authority for Pat. Appl. No. PCT/EP2008/009874.

* cited by examiner

METHOD AND SYSTEM FOR MERGING EXTENSIBLE DATA INTO A DATABASE USING GLOBALLY UNIQUE IDENTIFIERS

FIELD OF THE INVENTION

The present invention relates to a method of merging data from multiple databases into a single database. Specifically, the present invention relates to utilizing globally unique identifiers in the databases to distinguish between different types of data.

BACKGROUND OF THE INVENTION

Merging data contained in a plurality of databases is known. The databases may include fields of data defined by a name identifier. In some cases, different databases may contain different types of data identified by the same name identifier. When a user selects the data fields to be merged in the combined database, the fields having the same name identifier from the separate databases may be combined into a single data field, even if those fields represent different types of data.

SUMMARY OF THE INVENTION

An embodiment of the invention comprises a method of transferring a first set of data from a first database to a second database. The method includes the steps of comparing a metadata identifier assigned to a first set of data to a plurality of metadata identifiers associated with the second database; and combining the first set of data in the first database with a set of data in the second database having the same metadata identifier.

Embodiments of the invention further include the step of adding the first set of data to the second database if the metadata identifier does not match the plurality of metadata identifiers in the second database. The method may include the step of configuring a portion of the first database to store the first set of data. The metadata identifier is assigned to the first set of data when a user creates the first set of data. The method may include the step of configuring a portion of the second database to store a set of data of the same type as the first set of data in the first database.

In embodiments of the invention, the first database is stored on a device, and the second database is stored on a computer. In embodiments, the first database is stored on a first computer, and the second database is stored on a second computer.

An embodiment of the invention comprises a method for combining at least one subset of a set of data comprising a first database with a set of data comprising a second database. The method includes the steps of assigning a metadata identifier to each subset of data comprising the first database; assigning a metadata identifier to at least one subset of data comprising the second database; comparing each metadata identifier of the first database with each metadata identifier of the second database; and combining a subset of data of the first database with the second database if the metadata identifier of the first database is the same as the metadata identifier of the second database.

BRIEF DESCRIPTION OF THE DRAWINGS

The above-mentioned and other features of this invention, and the manner of attaining them, will become more apparent and the invention itself will be better understood by reference to the following description of embodiments of the invention taken in conjunction with the accompanying drawings, wherein.

Although the drawings represent embodiments of various features and components according to the present invention, the drawings are not necessarily to scale and certain features may be exaggerated in order to better illustrate and explain the present invention. The exemplifications set out herein illustrate embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates. Moreover, the embodiments were selected for description to enable one of ordinary skill in the art to practice the invention.

Concepts described below may be further explained in one of more of the co-filed patent applications entitled HELP UTILITY FUNCTIONALITY AND ARCHITECTURE U.S. Ser. No. 11/999,906, METHOD AND SYSTEM FOR GRAPHICALLY INDICATING MULTIPLE DATA VALUES U.S. Ser. No. 11/999,853, SYSTEM AND METHOD FOR DATABASE INTEGRITY CHECKING U.S. Ser. No. 11/999,856, METHOD AND SYSTEM FOR DATA SOURCE AND MODIFICATION TRACKING U.S. Ser. No. 11/999,888, PATIENT-CENTRIC HEALTHCARE INFORMATION MAINTENANCE U.S. Ser. No. 11/999,874, EXPORT FILE FORMAT WITH MANIFEST FOR ENHANCED DATA TRANSFER U.S. Ser. No. 11/999,867, GRAPHIC ZOOM FUNCTIONALITY FOR A CUSTOM REPORT U.S. Ser. No. 11/999,932, METHOD AND SYSTEM FOR SELECTIVE MERGING OF PATIENT DATA U.S. Ser. No. 11/999,859, METHOD AND SYSTEM FOR PERSONAL MEDICAL DATA DATABASE MERGING U.S. Ser. No. 11/999,772, METHOD AND SYSTEM FOR WIRELESS DEVICE COMMUNICATION U.S. Ser. No. 12/999,879, METHOD AND SYSTEM FOR SETTING TIME BLOCKS U.S. Ser. No. 11/999,968, METHOD AND SYSTEM FOR ENHANCED DATA TRANSFER U.S. Ser. No. 11/999,911, COMMON EXTENSIBLE DATA EXCHANGE FORMAT U.S. Ser. No. 11/999,871, METHOD OF CLONING SERVER INSTALLATION TO A NETWORK CLIENT U.S. Ser. No. 11/999,876, METHOD AND SYSTEM FOR QUERYING A DATABASE U.S. Ser. No. 11/999,912, METHOD AND SYSTEM FOR EVENT BASED DATA COMPARISON U.S. Ser. No. 11/999,921, DYNAMIC COMMUNICATION STACK U.S. Ser. No. 11/999,934, SYSTEM AND METHOD FOR REPORTING MEDICAL INFORMATION U.S. Ser. No. 11/999,878, METHOD AND SYSTEM FOR ACTIVATING FEATURES AND FUNCTIONS OF A CONSOLIDATED SOFTWARE APPLICATION U.S. Ser. No. 11/999,880, METHOD AND SYSTEM FOR CONFIGURING A CONSOLIDATED SOFTWARE APPLICATION U.S. Ser. No. 11/999,894, METHOD AND SYSTEM FOR DATA SELECTION AND DISPLAY U.S. Ser. No. 11/999,896, METHOD AND SYSTEM FOR ASSOCIATING DATABASE CONTENT FOR SECURITY ENHANCEMENT U.S. Ser. No. 11/999,951, METHOD AND SYSTEM FOR CREATING REPORTS U.S. Ser. No. 11/999,951, METHOD AND SYSTEM FOR CREATING USER-DEFINED OUTPUTS U.S. Ser. No. 11/999,905, DATA DRIVEN COMMUNICATION PROTOCOL GRAMMAR U.S. Ser. No. 11/999,770, HEALTHCARE MANAGEMENT SYSTEM HAVING IMPROVED PRINTING OF DISPLAY SCREEN INFORMATION U.S. Ser. No. 11/999,855, and METHOD AND SYSTEM FOR MULTI-DEVICE COMMUNICATION U.S. Ser. No. 11/999,866, the entire disclosures of which are hereby expressly incorporated herein by reference. It should be understood that the concepts described below may relate to diabetes management software systems for tracking and analyzing health data, such as, for example, the ACCU-CHEK® 360° product provided by Roche Diagnostics. However, the concepts described herein may also have applicability to apparatuses, methods, systems, and software in fields that are unrelated to healthcare. Furthermore, it should be understood that references in this patent application to devices, meters, monitors, pumps, or related terms are intended to encompass any currently existing or later developed apparatus that includes some or all of the features attributed to the referred to apparatus, including but not limited to the ACCU-CHEK® Active, ACCU-CHEK® Aviva, ACCU-CHEK® Compact, ACCU-CHEK® Compact Plus, ACCU-CHEK® Integra, ACCU-CHEK® Go, ACCU-CHEK® Performa, ACCU-CHEK® Spirit, ACCU-CHEK® D-Tron Plus, and ACCU-CHEK® Voicemate Plus, all provided by Roche Diagnostics or divisions thereof.

Figure 1:
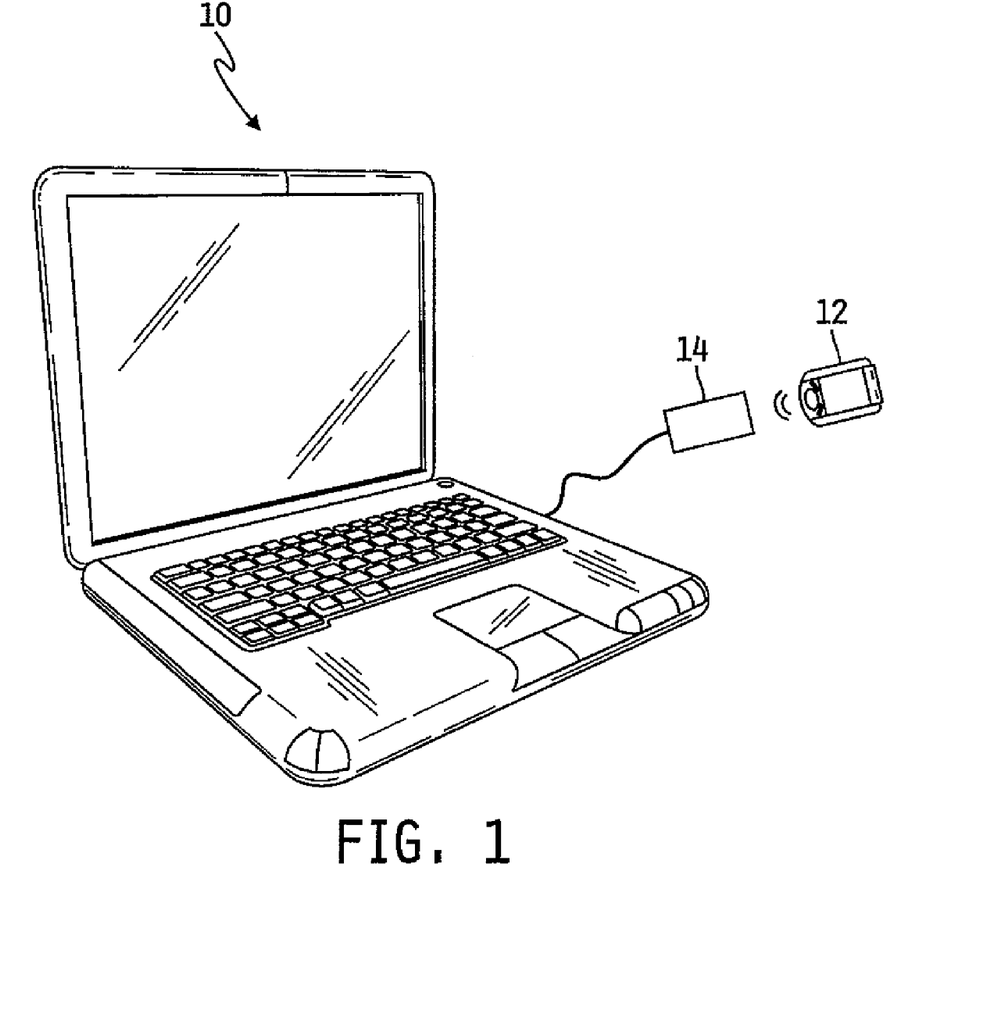
FIG. 1 depicts an example of an embodiment of a system utilizing the present invention.

FIG. 1 depicts a computer, generally indicated by numeral 10, and a medical device, generally indicated by numeral 12. Computer 10 may be any type of computer capable of running software. In the depicted embodiment, computer 10 is a laptop computer. In addition, computer 10 includes receiver 14. Receiver 14 may be connected to computer 10 in any suitable manner, such as through a USB connection, for example.

For purposes of the present example, computer 10 includes a hard drive (not shown) capable of storing data in a conventional manner. The software stored in the memory of computer 10 generally allows computer 10 to communicate with device 12. In embodiments, the software allows computer 10 to communicate with device 12 by way of receiver 14. In embodiments, the software installed on computer 10 may be ACCU-CHEK® 360° software manufactured by Roche Diagnostics. Although the software is described herein for operation on a computer (e.g., desktop, laptop or tablet), it should be understood that the principles of the invention may be embodied in software for operation on various devices, including but not limited to personal digital assistants ("PDAs"), infusion pumps, blood glucose meters, cellular phones, or integrated devices including a glucose measurement engine and a PDA or cellular device.

Device 12 may be any suitable medical device capable of communicating with the software stored on computer 10, such as a blood glucose meter, for example. Device 12 includes a dynamic memory, thereby allowing the device 12 to store and save various types of data. For example, as device 12 is utilized to measure exemplary physiological information in patients, such as the blood glucose levels of patients, and the measured values may be saved in the memory of the device 12. Furthermore, device 12 may allow a user to add additional data to the memory that is not measured directly by device 12, such as the weight of the patient, for example. In general, the data stored in the memory of device 12 may be stored in a database in the memory of device 12.

In the present example, the software executed by computer 10 is configured to allow computer 10 to communicate with device 12 by way of receiver 14. The communication between device 12 and receiver 14 may occur in any suitable manner. For example, device 12 and receiver 14 may communicate wirelessly, such as via infrared signals or via radio frequency signals. In embodiments, device 12 may communicate with receiver 14 in a non-wireless manner utilizing a direct connection, such as that which may be established using a suitable cord and plug combination, for example. It should be noted that in embodiments, the device 12 may communicate directly with computer 10, in a suitable manner. For example, device 12 may communicate with computer 10 in a wireless manner or non-wireless manner without the utilization of receiver 14.

Generally, once a connection between computer 10 and device 12 has been established, the data stored in the database of device 12 may be downloaded onto computer 10. The user may initiate the download process, or in embodiments, the download process may occur automatically.

Figure 2:
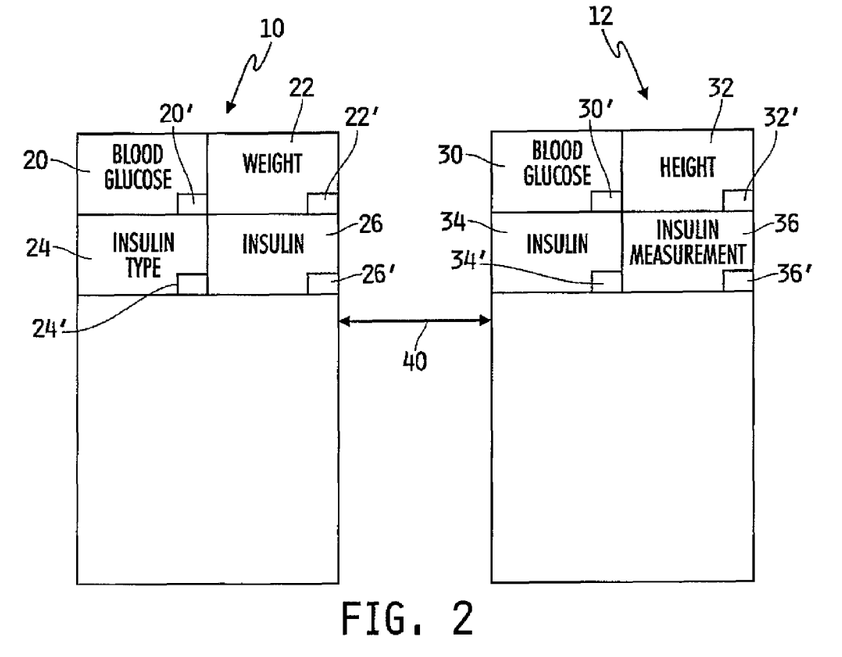
FIGS. 2 through 7 depict schematic diagrams illustrating embodiments of the present invention utilizing the system depicted in FIG. 1 for exemplary purposes.

FIG. 2 is a schematic that represents the databases in the memory of computer 10 and device 12. In FIG. 2, numerals 20, 22, 24, 26 represent different sets of various types of data stored in the memory of computer 10. Similarly, numerals 30, 32, 34, 36 represent different fields, or sets, of various types of data stored in the memory of device 12. Specifically, the memory of computer 10 includes data relating to blood glucose measurements of a patient, represented by numeral 20, weight measurements of a patient, represented by numeral 22, the type of insulin taken by a patient, represented by numeral 24, and the amount of insulin taken by a patient, represented by numeral 26. The memory of device 12 includes data associated with the blood glucose measurements of a patient, represented by numeral 30, the height measurements of a patient, represented by numeral 32, the type of insulin taken by a patient, represented by numeral 34, and the amount of insulin taken by a patient, represented by numeral 36.

It should be noted that the names identifying the data stored in computer 10 and device 12 may be generated in any suitable manner. For example, the names of the different types of data may be selected at the factory, during the manufacture of the software stored on computer 10 and the manufacture of device 12. In addition, some fields of data may be named either by a health care provider monitoring a patient, or by the patient himself. For instance, in the depicted example, the "blood glucose" data field may be added to the database during manufacture of the computer 10, but a health care provider may select the name "insulin type" 24 to represent the data stored on computer 10 that is associated with the type of insulin utilized by the patient after the provider has purchased the software installed on computer 10. Similarly, a patient may select the name "insulin" 34 to represent the data stored in device 12 relating to the type of insulin utilized by the patient. It should be noted that in the present example, the health care provider has used the title "insulin" to represent the data 26 associated with the amount of insulin being utilized by the patient.

Referring still to FIG. 2, each field of data 20, 22, 24, 26 stored within computer 10 includes a metadata identifier, or unique global identifier, represented by numerals 20', 22', 24', 26' respectively. Similarly, each field of data 30, 32, 34, 36 stored within device 12 includes a metadata identifier, represented by numerals 30', 32', 34', 36', respectively. The metadata identifiers 20', 22', 24', 26', 30', 32', 34', 36' may be associated with the data 20, 22, 24, 26, 30, 32, 34, 36 in any suitable manner. Generally, identical types of data have identical metadata identifiers. For example, the metadata identifier 20' assigned to the blood glucose data 20 stored on computer 10 is identical to the metadata identifier 30' assigned to the blood glucose data 30 stored on device 12. Similarly, the metadata 24' associated with insulin type data 24 stored on computer 10 is identical to the metadata 34' associated with the insulin type data 34 stored on device 12, even though the data fields 24, 34 have different names. It should noted that in embodiments, the data fields 24, 34 may have originally had identical names, but the names of the data fields 24, 34 may have been changed at a later time.

The metadata identifiers 20', 22', 24', 26', 30', 32', 34', 36' may be generated in any conventional manner. In the present example, the metadata identifiers are created by the application. As discussed above, certain types of data including the data field and the associated name, such as blood glucose measurements 20, 30 may be established at the factory during the production of the software utilized by computer 10 and device 12. Other types of data, such as the type of insulin utilized by the patient, may be configured for storage in the database by either the patient or the health care provider.

With respect to the pre-set data types that originate from the factory, pre-set metadata identifiers may be utilized to identify the pre-set data types. This understanding may hold true in later versions of the software, thereby allowing a specific pre-set data type to utilize an identical metadata identifier in multiple versions of the software and in different products. Generally, the metadata identifiers generated for data types originating at the factory are consistent for all deployments of software and devices. For example, in previous versions of the software a specific metadata identifier may be associated with measurements relating to blood glucose levels in a patient. Going forward, in each new version of software or each new version of medical device in production, the measurements relating to blood glucose level of a patient are associated with the same metadata identifier. Accordingly, later versions of the software will be capable of identifying various types of data utilized in earlier versions of the software or in older devices. The metadata identifiers created by the software or the device, after each has left the factory, are generally not repeated.

With reference still to FIG. 2, double arrow 40 represents the communication between computer 10 and device 12. The communication represented by arrow 40 may occur when a user is downloading data from device 12 onto computer 10.

Figure 3:
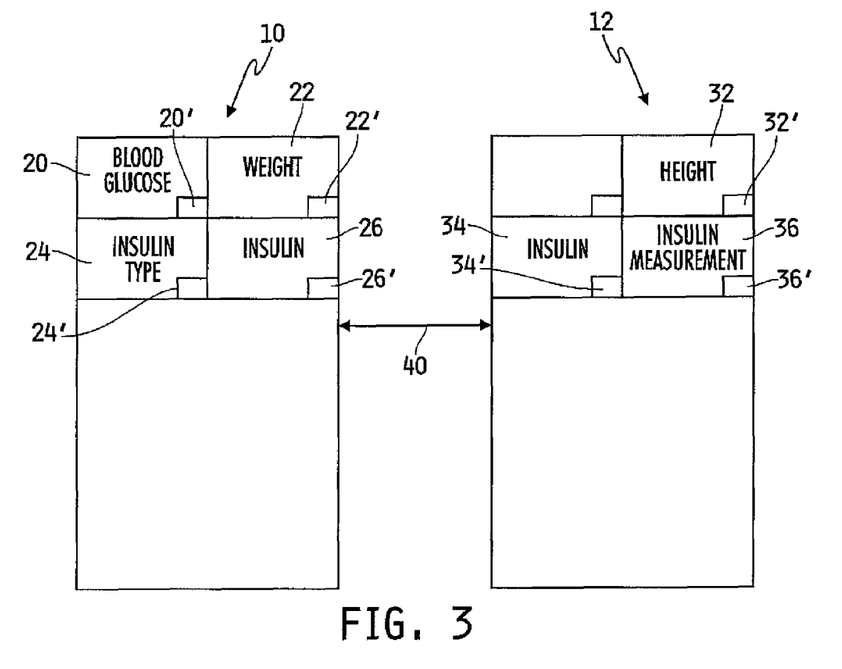

As computer 10 receives, for example, the data 30 relating to blood glucose measurements from device 12, the computer 10 compares metadata identifier 30' to the metadata identifiers 20', 22', 24', 26' present within the database resident in the memory of computer 10. In the present example, the metadata identifier 30' matches metadata identifier 20', since both of the metadata identifiers 20', 30' refer to the same type of data. Accordingly, the data relating to blood glucose measurements 30 present within the memory of device 12 is merged with the data relating to blood glucose measurements 20 present within the memory of computer 10. The merging of the data 20, 30 may be accomplished in any suitable manner. Once the blood glucose measurements 30 have been merged with the blood glucose measurements 20, the data relating to the blood glucose measurements 30 stored on device 12 may be deleted from device 12. FIG. 3 illustrates the memory of the computer 10 and the device 12 following the above described process.

Figure 4:
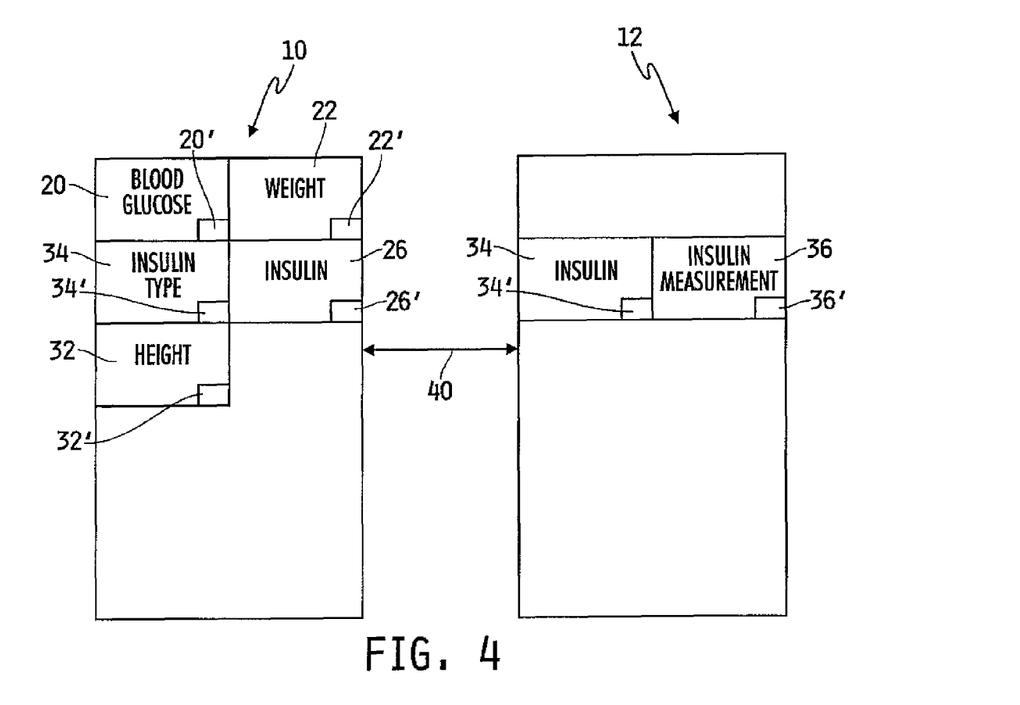

Computer 10 will continue to compare the metadata identifier as additional data is downloaded. Note that in the present example, computer 10 does not include metadata that corresponds to the metadata identifier 32'. Accordingly, the data representative of the height of the patient 32 is copied from device 12 onto computer 10 as a new data field. The data 32 may then be deleted from device 12, thereby leaving the memory of computer 10 and device 12 configured as depicted in FIG. 4. In embodiments of the invention, data 32 may not be copied onto computer 10 and may continue to reside on device 12.

Figure 5:
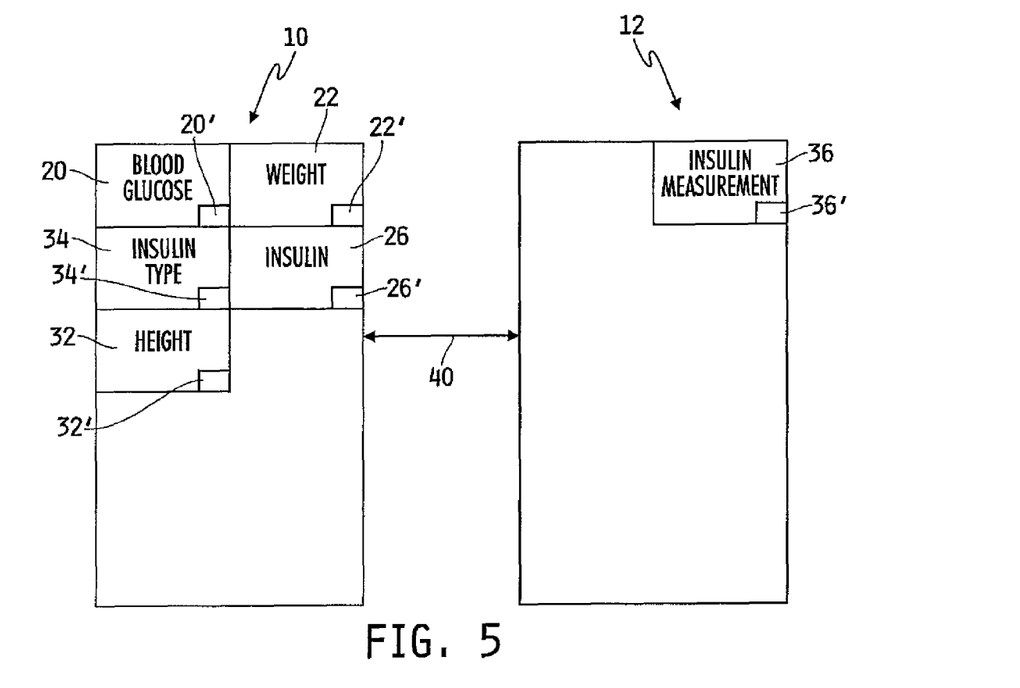
Figure 6:
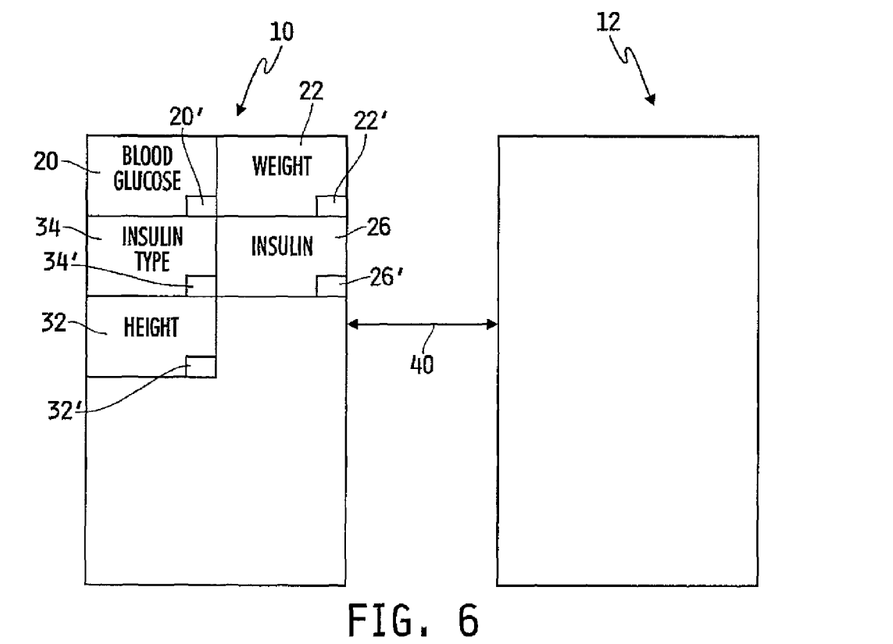

The type of insulin utilized by the patient is stored on device 12 in data field 34. Metadata identifier 34' identifies the data 34 in device 12. Accordingly, computer 10 compares metadata identifier 34' to the metadata identifiers 20', 22', 24', 26', 32' present within the memory of computer 10 in order to determine if computer 10 has a type of data corresponding to insulin 34. In the present example, metadata 34' corresponds to metadata 24', as both types of metadata 24', 34' identify data relating to the type of insulin being taken by the patient. It should be noted that the metadata identifiers 24', 34' are identical even though the data identifiers 24, 34 have different names. Accordingly, as shown in FIG. 5, the insulin data 34 may be combined with the insulin type data 24 in computer 10, and insulin data 34 may be deleted from device 12.

With reference still to FIG. 5, device 12 again sends metadata identifier 36' to computer 10. Computer 10 compares metadata identifier 36' with all of the metadata identifiers 20', 22', 24', 26', 32' stored in the memory of computer 10. In the present example, metadata identifier 36' corresponds to metadata identifier 26'. It should be noted that the data 36 corresponding to metadata identifier 36' has a different name than the data 26 corresponding to metadata identifier 26'. Since metadata 36' corresponds to metadata 26', however, the data represented by data field 36 is copied into the data field 26. Once the data 36 has been copied into the field 26, the data in field 36 may be deleted from device 12.

It should be noted that since the software running on computer 10 utilizes the metadata identifiers 20', 22', 24', 26', 30', 32', 34', 36' to actually identify the different data types, the different data types may be identified by any name. Thus, in embodiments of the invention, users may add additional data fields to the computer 10 and/or device 12 after the computer 10 and device 12 have been shipped from the factory. As the users add new data types to the memory, the software on the computer 10 and device 12 assigns a suitable metadata identifier to the data field. The computer 10 and device 12 may generate the metadata identifier in any suitable manner.

In embodiments of the invention, the user of the computer 10 may create a data field configured to store a specific type of data, and the user of device 12 may create a data field configured to store the same specific type of data. For example, with respect to FIG. 7, the user of computer 10 may create a user defined data field to record the blood pressure of the patient. In the depicted embodiment, numeral 50 represents the blood pressure field of data on computer 10, and numeral 50' represents the metadata identifier of the blood pressure data 50 on computer 10. Similarly, a user may create a field of data capable of storing blood pressure measurements on device 12. In the depicted embodiment, numeral 52 represents the blood pressure field of data on device 12, and numeral 52' represents the metadata identifier of the blood pressure data 52 on device 12. For purposes of the present example, it is assumed that the user entered different blood pressure data of the same type on computer 10 and device 12.

Figure 7:
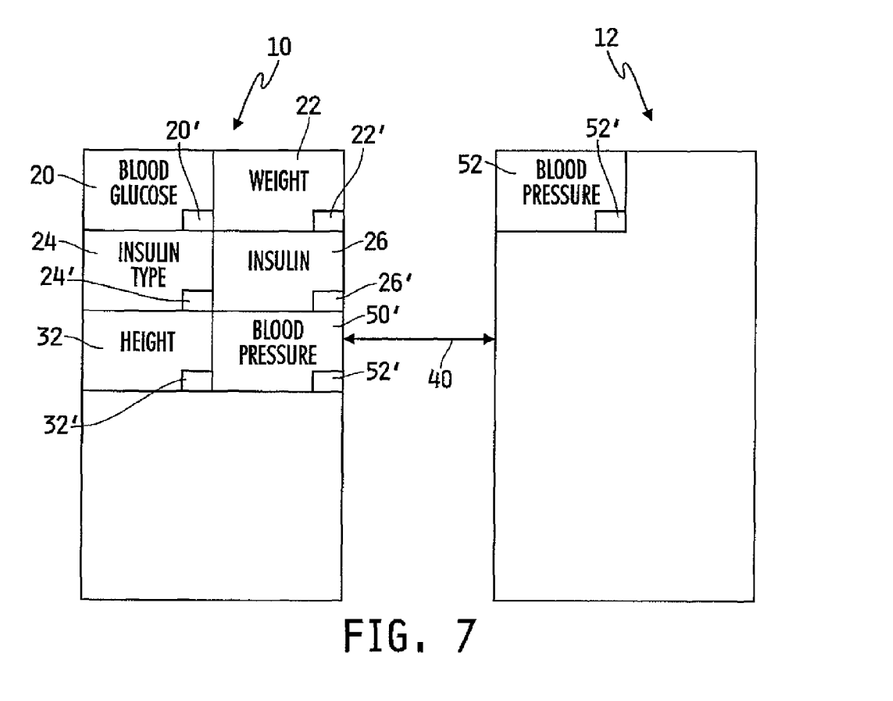

Once the link 40 is established between computer 10 and device 12, in a manner similar to that described above, computer 10 will compare metadata identifier 52' to the metadata identifiers 20', 22', 24', 26', 32', 50' stored in the database of computer 10. In this example, since the data fields 50, 52 for the blood pressure data on the computer 10 and device 12 were created independent of each other, the respective metadata identifiers 50', 52' are not identical. Thus, during the download process, the user may manually instruct the computer 10 to consider the metadata identifiers 50', 52' as being identical since the identifiers identify the same type of data. Accordingly, the computer 10 combines data 52 with data 50, and data 52 is deleted from device 12. Thus, computer 10, when queried to display blood pressure data, will display all data associated with metadata identifiers 50', 52'. In addition, going forward, computer 10 will automatically associate metadata identifier 52' with metadata identifier 50'. Thus, in the future, when device 12 is linked to computer 10 and computer 10 receives metadata identifier 52' from device 12, computer 10 will associate data field 52 with data field 50, in a manner described above.

It should be noted that the computer 10 is also capable of uploading data onto device 12. Generally, this would occur in a manner similar to that described above, wherein the device would compare the metadata identifier of the newly received data with the metadata identifiers of the data stored on the device before determining whether the newly received data was new data or intended to be combined with data already present on the device.

Although the software is described herein for operation on a computer (e.g., desktop, laptop or tablet), it should be understood that the principles of the invention may be embodied in software for operation on various devices, including but not limited to personal digital assistants ("PDAs"), infusion pumps, blood glucose meters, cellular phones, or integrated devices including a glucose measurement engine and a PDA or cellular device.

In addition to blood glucose values, exemplary physiological information includes A1c values, Albumin values, Albumin excretion values, body mass index values, blood pressure values, carbohydrate values, cholesterol values (total, HDL, LDL, ratio) cheatinine values, fructosamine values, HbA1values, height values, insulin dose values, insulin rate values, total daily insulin values, ketone values, microalbumin values, proteinuria values, heart rate values, temperature values, triglyceride values, and weight values.

The invention is described herein with reference to healthcare data management software, and more particularly, with reference to diabetes management software, although the invention may be applied, generally, to data management systems in fields unrelated to healthcare management.

While the invention is described herein with reference to medical devices, and more particularly, with reference to diabetes management devices, the invention is applicable to any data obtained from any device.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of transferring a first set of data from a first database to a second database comprising the steps of:
    comparing a first identifier assigned to a first set of data stored in a first database to a plurality of second identifiers associated with a second database, the first identifier being assigned to the first set of data when the first set of data is generated and being independent of content of the first set of data, each of the plurality of second identifiers being assigned to a portion of the second database configured to receive sets of data having identical identifiers assigned thereto; and
    transferring the first set of data in the first database to the portion of the second database having a second identifier that is identical to the first identifier assigned to the first set of data, the first database being stored on a device, wherein the first set of data is transferred to a portion of the second database which does not have a second identifier assigned thereto when the first identifier differs from the plurality of second identifiers, the first identifier comprising the second identifier assigned to the portion of the second database to which the first set of data is assigned.

2. The method as set forth in claim 1 further comprising the step of configuring a portion of the first database to store the first set of data.

3. The method as set forth in claim 1 further comprising the step of configuring a portion of the second database to store a set of data of the same type as the first set of data in the first database.

4. The method as set forth in claim 1 wherein the second database is stored on a computer.

5. The method as set forth in claim 1 wherein the first database is stored on a first computer and the second database is stored on a second computer.

6. A method for combining at least one subset of a first set of data comprising a first database with a set of data comprising a second database, the method comprising the steps of:
    assigning a first identifier to each subset of the first set of data comprising the first database, the first identifier being independent of content of the first set of data;
    assigning a second identifier to at least one subset of the set of data comprising the second database, the second identifier being independent of content of the set of data comprising the second database, the second database being stored on a computer;
    comparing the first identifier assigned to a subset of the first set of data of the first database with the second identifier assigned to the subset of the second database; and
    combining the subset of the first set of data of the first database with the subset of the second database if the first identifier is identical to the second identifier, wherein when the first identifier differs from the second identifier, the subset of the first set of data is combined with a subset of the second database which does not have a second identifier, the first identifier comprising the second identifier assigned to the subset of the second database to which the subset of the first set of data is assigned.

7. The method as set forth in claim 6 wherein the first database is stored on a medical device.

8. The method as set forth in claim 6 further comprising the step of associating the first identifier assigned to the first subset of data of the first database with the second identifier assigned to the subset of data of the second database.

9. The method as set forth in claim 6 further comprising the step of naming each subset of data.

10. The method as set forth in claim 6 further comprising the step of adding an additional subset of data to the second database.

11. The method as set forth in claim 10 further comprising the step of generating a first identifier relating to the additional subset of data, the first identifier being generated and assigned to the additional subset of data when the additional subset of data is generated.

12. The method as set forth in claim 11 further comprising the step of comparing the first identifier assigned to the additional subset of data to the second identifiers assigned to the subsets of the second database.

13. The method as set forth in claim 12 further comprising the step of adding the additional subset of data to the second database if the first identifier assigned to the additional subset of data is not identical to any of the second identifiers assigned to the subsets of the second database.

14. The method as set forth in claim 12 further comprising the step of combining the additional subset of data with a subset of data of the second database identified by a second identifier identical to the first identifier associated with the additional subset of data.

15. The method as set forth in claim 6 wherein each first identifier of the first database is compared with each second identifier assigned to the subsets of the second database.

16. The method as set forth in claim 1 further comprising the step of providing an indication that the first identifier assigned to the first set of data does not match any of the plurality of second identifiers associated with the second database.

17. The method of claim 1, further including the steps of:
generating the first set of data, the step of generating performed by a medical device adapted to generate the first set of data from a patient sample and store the first set of data in the first database; and
assigning the first identifier to the first set of data, the first identifier generated and assigned to the first set of data by an application of the medical device.

18. The method of claim 17, wherein the content of the first set of data is blood glucose measurement data and the first identifier assigned thereto is assigned to all sets of data having content comprising blood glucose measurement data generated by the medical device.

19. The method as set forth in claim 1, wherein the first identifier assigned to the first set of data is associated with a medical device adapted to generate subsets of data from a patient sample.

20. The method as set forth in claim 4, wherein the each of the plurality of second identifiers associated with the second database are assigned to the portions of the second database by an application of a healthcare management software executable by the computer and adapted to communicate with a medical device configured to generate the first set of data.

21. The method as set forth in claim 6, wherein the second step of assigning further comprises assigning one of a plurality of second identifiers to each of a plurality of subsets of the second database.

22. The method as set forth in claim 21, wherein the step of comparing comprises comparing the first identifier assigned to a subset of the first set of data of the first database to the plurality of second identifiers assigned to each of the plurality of subsets of the second database.

23. The method as set forth in claim 6, wherein the first identifier assigned to each subset of the first set of data is associated with an individual.

24. The method as set forth in claim 6, wherein the first identifier assigned to each subset of the first set of data is associated with a medical device adapted to generate subsets of data from a patient sample.

25. The method as set forth in claim 24, wherein the second step of assigning a second identifier to the subsets of the set of data comprising the second database is performed by an application of a healthcare management software executable by a computer and adapted to communicate with the medical device configured to generate the first set of data with the first identifier assigned thereto.

26. The method as set forth in claim 6, wherein the subset of the first set of data is blood glucose measurement data and the first identifier assigned thereto is specific for blood glucose measurement data.

27. A method of combining a first set of data in a first database with a subset of a second database, the method comprising the steps of:
generating a first set of data, the step of generating performed by a medical device capable of generating the first set of data from a patient sample;
inputting the first set of data into a first database, the first database being in a memory of the medical device;
assigning a first identifier to the first set of data, the step of assigning performed by an application of the medical device when the first set of data is generated, the first identifier being independent of content of the first set of data;
assigning a second identifier to each of an at least one subset of a second database, the step of assigning performed by software stored in a memory of a computing device and having a plurality of machine readable instructions executable by a processor of the computing device and capable of communicating with the medical device, the second database being in the memory of the computing device, the second identifier assigned to each of the at least one subset being different from the second identifiers assigned to the other subsets of the second database and being independent of the content of the first set of data;
comparing the first identifier to the second identifiers assigned to each of the at least one subset of the second database, the step of comparing performed by the plurality of machine readable instructions of the software; and
combining the first set of data with the subset of the second database having a second identifier assigned thereto that is identical to the first identifier assigned to the first set of data, wherein the first set of data is combined with a subset of the second database which does not have a second identifier assigned thereto when the first identifier differs from the second identifiers of the second database, the first identifier remaining assigned to the first set of data when combined with the subset of the second database and comprising the second identifier assigned to the subset of the second database to which the first set of data is assigned, the step of assigning performed by the plurality of machine readable instructions of the software.

28. The method according to claim 27, wherein the first identifier is derived from an identification code of the medical device.

29. The method according to claim 27, wherein the first set of data is blood glucose measurement data.

* * * * *